(12) United States Patent
Horth et al.

(10) Patent No.: US 12,019,286 B2
(45) Date of Patent: Jun. 25, 2024

(54) OPTICAL EDGE COUPLER HAVING A HETEROGENEOUS CLADDING STRUCTURE

(71) Applicant: Nokia Solutions and Networks OY, Espoo (FI)

(72) Inventors: Alexandre Horth, Astoria, NY (US); Jiabao Zheng, Port Washington, NY (US); Matthew Streshinsky, Taos, NM (US)

(73) Assignee: Nokia Solutions and Networks Oy, Espoo (FI)

( * ) Notice: Subject to any disclaimer, the term of this patent is extended or adjusted under 35 U.S.C. 154(b) by 125 days.

(21) Appl. No.: 17/561,063

(22) Filed: Dec. 23, 2021

(65) Prior Publication Data

US 2023/0204875 A1    Jun. 29, 2023

(51) Int. Cl.
*G02B 6/42*    (2006.01)
(52) U.S. Cl.
CPC .................... *G02B 6/4206* (2013.01)
(58) Field of Classification Search
CPC ........................................................ G02B 6/42
USPC ............................................................ 385/14
See application file for complete search history.

(56) References Cited

U.S. PATENT DOCUMENTS

| | | | |
|---|---|---|---|
| 6,684,007 B2* | 1/2004 | Yoshimura | G02B 6/43 257/E25.032 |
| 10,514,499 B2* | 12/2019 | Novack | G02B 6/12007 |
| 10,642,077 B1 | 5/2020 | Andy et al. | |
| 10,775,560 B1* | 9/2020 | Fujita | G01N 21/552 |
| 10,877,229 B2 | 12/2020 | Tummidi | |
| 10,884,190 B2 | 1/2021 | Horth | |
| 10,942,314 B2* | 3/2021 | Horth | G02B 6/12002 |
| 11,022,755 B2 | 6/2021 | Chen et al. | |
| 11,085,998 B2 | 8/2021 | Sayyah et al. | |

(Continued)

FOREIGN PATENT DOCUMENTS

| | | |
|---|---|---|
| FR | 3008493 A1 | 1/2015 |
| WO | 0188577 A1 | 11/2001 |

OTHER PUBLICATIONS

Extended European Search Report for corresponding European application No. 22213663.2; dated May 23, 2023 (8 pages).

(Continued)

*Primary Examiner* — Kaveh C Kianni
(74) *Attorney, Agent, or Firm* — Mendelsohn Dunleavy, P.C.; Steve Mendelsohn

(57) ABSTRACT

A PIC comprising an optical edge coupler having a plurality of optical cores within a heterogeneous stack of dielectric layers providing an optical cladding for the optical cores. The layer stack comprises first and second groups of layers, wherein refraction-index differences between individual layers of the same group are much smaller than refraction-index differences between any two layers from different groups. The optical cores are arranged in a plurality of parallel planar arrays enabling a large MFD change. At least one of the arrays is located within the first group of layers, and at least another one of the arrays is located within the second group of layers. End sections of the optical cores are adjacent to an edge of the PIC and may be optically coupled to an external optical fiber or on-chip waveguide of another PIC for a low-loss transfer of optical power therebetween.

20 Claims, 3 Drawing Sheets

(56) References Cited

U.S. PATENT DOCUMENTS

| | | | | |
|---|---|---|---|---|
| 11,275,211 | B2* | 3/2022 | Kopinetz | G02B 6/30 |
| 11,493,686 | B2* | 11/2022 | Bian | G02B 6/122 |
| 2015/0063755 | A1* | 3/2015 | Doany | G02B 6/30 |
| | | | | 385/59 |
| 2015/0247974 | A1* | 9/2015 | Painchaud | G02B 6/12004 |
| | | | | 385/28 |
| 2016/0025942 | A1* | 1/2016 | Pepe | G02B 6/3825 |
| | | | | 385/24 |
| 2016/0131842 | A1* | 5/2016 | Mahgerefteh | G02B 6/136 |
| | | | | 385/11 |
| 2017/0139146 | A1* | 5/2017 | Novack | G02B 6/29332 |
| 2019/0227230 | A1* | 7/2019 | Novack | G02B 6/124 |
| 2021/0026074 | A1* | 1/2021 | Horth | G02B 6/1228 |
| 2022/0043222 | A1* | 2/2022 | Novack | G02B 6/4204 |
| 2023/0104227 | A1* | 4/2023 | Bian | G02B 6/1228 |
| | | | | 385/43 |

OTHER PUBLICATIONS

Bogaerts, Wim, et al. "Chapter 3: Off-Chip Coupling." Handbook of Silicon Photonics, CRC Press. (2013): 98-138.

He, Jingwen, et al. "Review of Photonic Integrated Optical Phased Arrays for Space Optical Communication." IEEE Access 8 (2020): 188284-188298.

Marchetti, Riccardo, et al. "Coupling strategies for silicon photonics integrated chips." Photonics Research 7.2 (2019): 201-239.

Mu, Xin, et al. "Edge Couplers in Silicon Photonic Integrated Circuits: A Review." Applied Sciences 10.4:1538 (2020): 1-29.

Niu, Ben. "High Efficiency Edge Coupler, Novel Nonlinear Optical Polymers with Large Kerr-Coefficient and Automatic Layout Generation in Silicon Photonics." Dissertation 1372. Purdue University (2016): 1-89.

Papes, Martin, et al. "Fiber-chip edge coupler with large mode size for silicon photonic wire waveguides." Optics Express 24.5 (2016): 5026-5038.

Son, Gyeongho, et al. "High-efficiency broadband light coupling between optical fibers and photonic integrated circuits." Nanophotonics 7.12 (2018): 1845-1864.

Yang, Huai, "Efficient Coupling Interfaces for Silicon Photonics Applications." Thesis. Faculty of Engineering, McGill University (2018): 1-70.

* cited by examiner

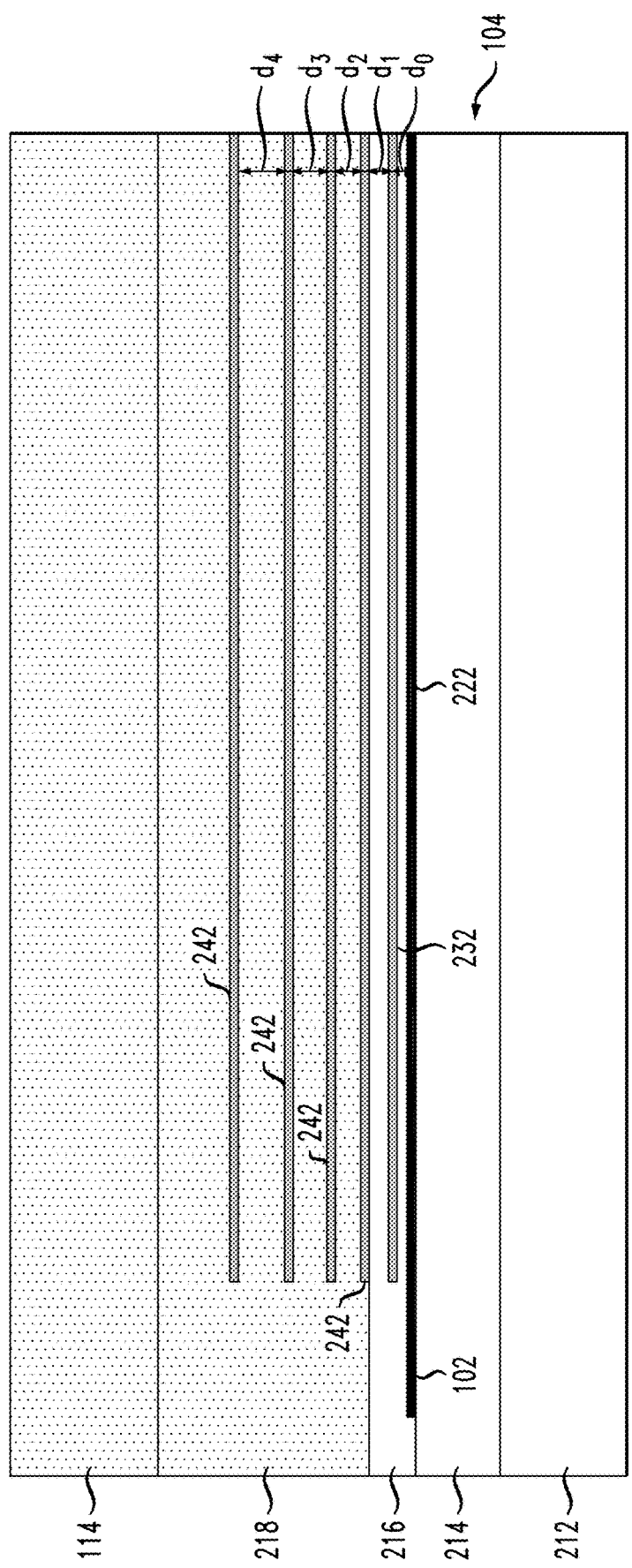

OPTICAL EDGE COUPLER HAVING A HETEROGENEOUS CLADDING STRUCTURE

BACKGROUND

Field

Various example embodiments relate to optical communication equipment and, more specifically but not exclusively, to light coupling into and out of photonic integrated circuits (PICs).

Description of the Related Art

This section introduces aspects that may help facilitate a better understanding of the disclosure. Accordingly, the statements of this section are to be read in this light and are not to be understood as admissions about what is in the prior art or what is not in the prior art.

The optical coupling efficiency between two optical waveguides can be quantified using the ratio of guided optical powers before and after the waveguide connector. For end-connected waveguides, such ratio may be approximately proportional to the ratio of the squared mode-field diameter (MFD) of the smaller guided mode to the squared MFD of the larger guided mode. For single-mode operation at telecommunication wavelengths (e.g., at ~1550 nm), the cross-section of an on-chip silicon waveguide core embedded in a silica cladding can be on a submicron scale. The corresponding guided optical mode may typically be tightly confined near the optical waveguide core, e.g., with an approximate MFD of about 0.3 μm. In contrast, a typical MFD of a standard single-mode fiber (SMF) may be about 10 μm. The MFD difference of this magnitude may be a significant obstacle to the implementation of efficient optical coupling. However, low-loss optical interfaces between different types of optical waveguides, e.g., on-chip optical waveguides and off-chip optical fibers, are needed for many practical applications, such as optical transceivers, optical interconnects, optical signal processing, integrated optics, etc.

SUMMARY OF SOME SPECIFIC EMBODIMENTS

Disclosed herein are various embodiments of a PIC comprising an optical edge coupler having a plurality of optical cores placed within a heterogeneous stack of dielectric layers, which provide an optical cladding for the optical cores. In an example embodiment, the layer stack comprises first and second groups of layers, wherein refraction-index differences between individual layers of the same group are much smaller than refraction-index differences between any two layers from different groups. The optical cores are arranged in a plurality of parallel planar arrays enabling a large (e.g., by a factor of 30) MFD change. At least one of the arrays is located within the first group of layers, and at least another one of the arrays is located within the second group of layers. End sections of the optical cores are adjacent to an edge of the PIC and may be optically coupled to an external optical fiber or on-chip waveguide of another PIC for a low-loss transfer of optical power therebetween.

In an example embodiment, the PIC may be implemented using a silicon-photonics material platform.

Possible improvements provided by disclosed edge-coupler embodiments with respect to the present state of the art may include better stability of the shape, size, and position of the mode-field area when the PIC is exposed to hot/humid ambient conditions, slower degradation of the optical coupling efficiency due to aging, and improved robustness of the performance characteristics with respect to variances of the PIC-fabrication process.

According to an example embodiment, provided is an apparatus, comprising: a substrate having a substantially planar main surface; and an optical edge coupler located adjacent an edge of the substrate; and wherein the optical edge coupler comprises: a plurality of optical cores supported along said main surface of the substrate; and a vertical stack of dielectric layers arranged along said main surface, the vertical stack of dielectric layers being an optical cladding for the optical cores such that some of the optical cores are located in a first subset of the layers and others of the optical cores are located in a second subset of the layers, each of the first and second subsets including respective one or more of the layers, the one or more layers of the first subset having a different refraction index than the one or more layers of the second subset, the one or more layers of the first subset being closer to the main surface than the one or more layers of the second subset, at least some of the optical cores having end segments thereof adjacent to the edge.

According to another example embodiment, provided is an apparatus, comprising: a plurality of optical cores supported on a main surface of a substantially planar substrate; and a vertical stack of dielectric layers arranged along the main surface to provide an optical cladding for the optical cores, the dielectric layers including a first group of layers characterized by a first refraction index and a second group of layers characterized by a different second refraction index, the first group of layers having a smaller vertical distance to the main surface than the second group of layers, at least some of the optical cores having end sections thereof adjacent to an edge of the vertical stack; and wherein the plurality of optical cores has two or more first optical cores in the first group of layers and two or more second optical cores in the second group of layers.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 shows another cross-sectional view of the PIC shown in FIG. 1A, 1B, or 1C according to an embodiment.

DETAILED DESCRIPTION

Figure 1A:
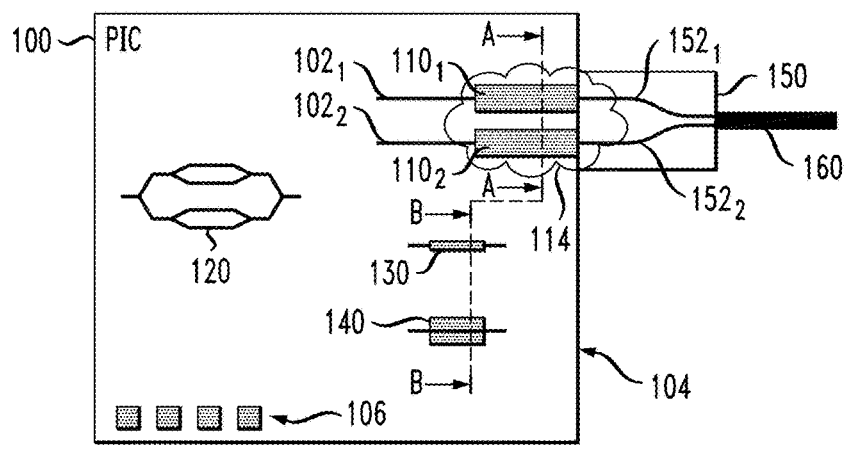
FIGS. 1A-1C schematically illustrate example configurations of optical edge couplers of a PIC according to several possible embodiments.

As used herein, the term "photonic integrated circuit" (or PIC) should be construed to cover planar lightwave circuits (PLCs), integrated optoelectronic devices, and hybrid integrated optical devices. Example materials that can be used for manufacturing various PICs may include III-V semiconductor materials, silicon, germanium and silicon-germanium alloys, silicon nitride, silica glasses, lithium niobate and derivatives, metals, polymers, etc.

PICs are used for various applications in telecommunications, instrumentation, and signal-processing fields. A PIC typically uses optical waveguides to implement and/or interconnect various circuit components, such as optical switches, couplers, splitters, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's optical core and cladding. A PIC typically comprises a planar substrate onto which optoelectronic devices are grown by an additive manufacturing process and/or into which optoelectronic devices are etched by a subtractive manufacturing processes, e.g., using a multi-step sequence of photolithographic and chemical processing steps.

An "optoelectronic device" can interact with both light and electrical signals (i.e., currents or voltages) and may include one or more of: (i) an electrically driven light source, such as a laser diode; (ii) an optical amplifier; (iii) an optical-to-electrical converter, such as a photodiode; and (iv) an optoelectronic component that can control the propagation and/or certain properties of light, such as an optical modulator or a switch. The corresponding optoelectronic circuit may additionally include one or more optical elements and/or one or more electronic components that enable the use of the circuit's optoelectronic devices in a manner consistent with the circuit's intended function. Some optoelectronic devices may be implemented using one or more PICs.

In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Such a wafer may then cut ("diced") into many pieces (chips, dies), with at least some of the individual chips containing a respective copy of the circuit that is being fabricated. An individual functional die can be appropriately packaged prior to being incorporated into a larger circuit or be left non-packaged.

In some embodiments, individual dies or chips can be stacked. As used herein, the term "stack" refers to an orderly arrangement of packaged or non-packaged dies in which the main planes of the stacked dies face and are near each other. The facing dies or chips may be electrical connected, e.g., using patterned conducting (such as metal) layers, ball-grid arrays, solder bumps, wire bonds, etc. In some such embodiments, the dies or chips of a stack can be mounted on a mechanical carrier in an orientation in which the main plains of the stacked dies are parallel to each other and/or to the main plane of the mechanical carrier. In some such embodiments, one of the dies or chips of the stack may function as the mechanical carrier.

A "main plane" of an object, such as a die, a PIC, a substrate, or an IC, is a plane parallel to a substantially planar surface thereof that has about the largest area among exterior surfaces of the object. This substantially planar surface may be referred to as a main surface. The exterior surfaces of the object that have one relatively large size, e.g., length, but are of much smaller area, e.g., less than one half of the main-surface area, are typically referred to as the edges of the object.

Optical edge coupling (also sometimes referred to as in-plane coupling) is used, e.g., to couple a light beam into/out of an on-chip waveguide through an edge of the corresponding PIC. In this arrangement, the light beam may continue to propagate substantially parallel to the main surface of the PIC, without significantly changing the propagation direction as it enters or exits the PIC through the edge thereof. Edge coupling should be contrasted with vertical coupling (also sometimes referred to as surface coupling), wherein a light beam may be incident nearly orthogonally to the main surface of the PIC, and the corresponding vertical coupler operates to change the propagation direction by approximately 90 degrees to allow coupling of the light into an on-chip waveguide, which is typically horizontal, i.e., approximately parallel to the main surface of the PIC. A typical vertical-coupling solution may be based on one or more diffraction gratings.

Figure 1B:
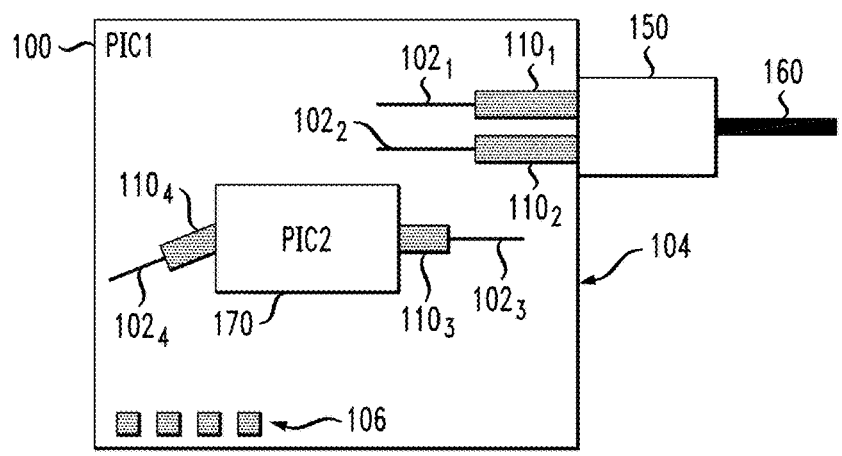
Figure 1C:
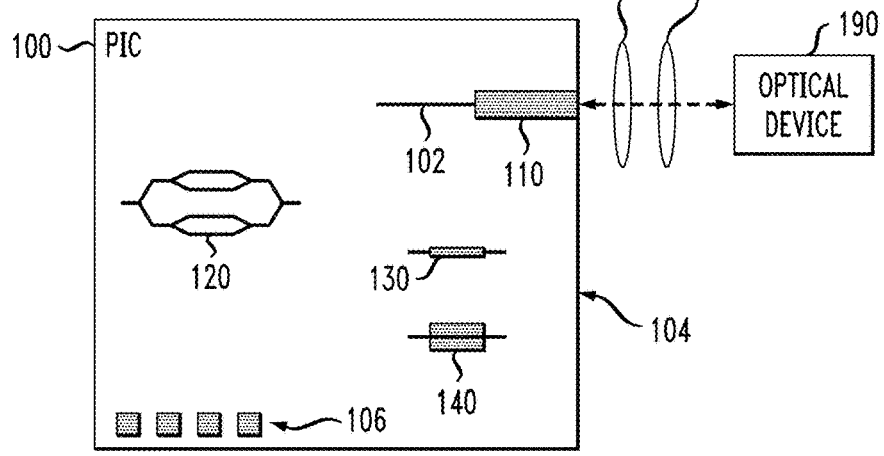

FIGS. 1A-1C schematically illustrate several example configurations of optical edge couplers 110 of a PIC 100 according to various embodiments. More specifically, each of FIGS. 1A-1C shows a schematic top view of a respective optical assembly comprising PIC 100. Herein, the term "top view" refers to a view direction that is orthogonal to a main plain of PIC 100 in the shown optical assemblies. In some pertinent literature, an optical edge coupler, such as an optical edge coupler 110, may be referred-to as a spot-size converter or a mode expander.

FIG. 1A shows an embodiment of PIC 100 comprising optical edge couplers $110_1$ and $110_2$. Optical edge coupler $110_1$ is optically connected to couple light between an on-chip optical waveguide core $102_1$ of PIC 100 and an optical fiber $152_1$ of a fiber assembly block (FAB) 150. Optical edge coupler $110_2$ is similarly optically connected to couple light between an on-chip optical waveguide core $102_2$ of PIC 100 and an optical fiber $152_2$ of FAB 150. FAB 150 may be attached to PIC 100 using an adhesive (e.g., epoxy) layer 114 such that light can transfer between optical edge couplers $110_1$ and $110_2$ and optical fibers $152_1$ and $152_2$, respectively, through an edge 104 of PIC 100. Optical fibers $152_1$ and $152_2$ may extend beyond FAB 150, wherein these optical fibers may or may not be bundled into a fiber-optic cable 160.

As shown in FIG. 1A, PIC 100 further comprises an optical modulator 120, an optical phase shifter 130, and a photodetector 140, each of which is implemented using respective additional on-chip optical waveguides. Some or all of the latter on-chip optical waveguides may be optically connected to one or both of the on-chip optical waveguide cores $102_1$ and $102_2$. In some embodiments, optical modulator 120, optical phase shifter 130, and photodetector 140 may be parts of an optical data transceiver.

PIC 100 further comprises a plurality of electrical contact pads 106. Electrical contact pads 106 may be internally electrically connected, by way of metal-interconnect structures (e.g., 238, FIG. 2), to various electrical circuits of PIC 100 and externally electrically connected to external electrical circuits. Such electrical connections may typically be arranged to enable the intended operation of PIC 100.

In some embodiments, epoxy layer 114 may be absent (e.g., see FIG. 1B). In such embodiments, for example, suitable conventional mechanical means may be used to fix the relative positions of PIC 100 and end sections of optical fibers $152_1$ and $152_2$, as well as FAB 150.

In the embodiment of FIG. 1B, PIC 100 also includes optical edge couplers $110_3$ and $110_4$. Optical edge coupler $110_3$ is optically connected to couple light between an on-chip optical waveguide core $102_3$ of PIC 100 and an on-chip optical waveguide (not explicitly shown in FIG. 1B) of a PIC 170. Optical edge coupler $110_4$ is similarly optically connected to couple light between an on-chip optical waveguide core $102_4$ of PIC 100 and another on-chip optical waveguide (not explicitly shown in FIG. 1B) of PIC 170. PIC 170 may be positioned in a recessed area of PIC 100, e.g., in a flip-chip configuration, to provide suitable vertical alignment between the on-chip optical waveguides of PICs 100 and 170. In an example embodiment, PICs 100 and 170 may be implemented using different respective material platforms. Depending on the specific embodiment, PIC 170 may or may not have its own optical edge couplers optically coupled to optical edge couplers $110_3$ and $110_4$ of PIC 100. Herein, the term "vertical" refers to a direction that is approximately orthogonal to a main plain of PIC 100. The term "horizontal" refers to a direction that is approximately parallel to said main plain of PIC 100.

In the embodiment of FIG. 1C, optical edge coupler 110 of PIC 100 is optically connected to couple light between an on-chip optical waveguide core 102 and an external optical device 190. This particular optical connection is implemented using free-space optics exemplified in FIG. 1C by bulk lenses $180_1$ and $180_2$. In an example embodiment, optical device 190 may comprise a laser.

In an example embodiment, PIC 100 may be a silicon-photonics circuit manufactured using a silicon-on-insulator (SOI) wafer and using conventional CMOS fabrication processes. Such SOI wafer may typically comprise: (i) a high-quality Si layer, also referred-to as the device layer; (ii) a buried oxide (BOX) layer of electrically insulating silicon dioxide on which the high-quality Si layer is located; and (iii) a bulk silicon layer, also referred to as the handle or substrate, on which the BOX layer is located. The processing applied to the SOI wafer to make a PIC, such as PIC 100, is typically implemented using two distinct processing stages, which are typically referred to as front-end-of-line (FEOL) processing and back-end-of-line (BEOL) processing.

During the FEOL processing, individual circuit devices, such as transistors, capacitors, resistors, etc., may be patterned and formed using the device layer of the SOI wafer and any needed additional layers formed thereon. In the context of CMOS processes, FEOL processing typically encompasses fabrication steps directed to forming optical elements and/or isolated electrical CMOS elements. Such fabrication steps may include but are not limited to: (a) chemical-mechanical planarization (CMP) and cleaning of the wafer; (b) patterning the device layer; (c) shallow trench isolation (STI); (d) well formation; (e) gate formation; (f) source and drain module formation, etc.

During the BEOL processing, the individual circuit devices formed during the FEOL processing may be electrically interconnected. For example, contact pads, interconnect wires, vias, and various dielectric structures may be formed. Example BEOL fabrication steps may include but are not limited to: (g) silicidation of source, drain, and poly-silicon regions; (h) forming and patterning various dielectric layers, some of which may be used as optical cladding; (i) forming and patterning various metal layers; (j) making vias; and (k) forming passivation layers.

After the BEOL processing, the wafer may be subjected to post-fabrication processing. Such processing may include but is not limited to wafer testing, wafer-back grinding, dicing, die testing, and chip packaging. In contrast to the FEOL and BEOL processing, at least some of the steps of the post-fabrication processing may be performed outside the clean-room environment.

Figure 2:
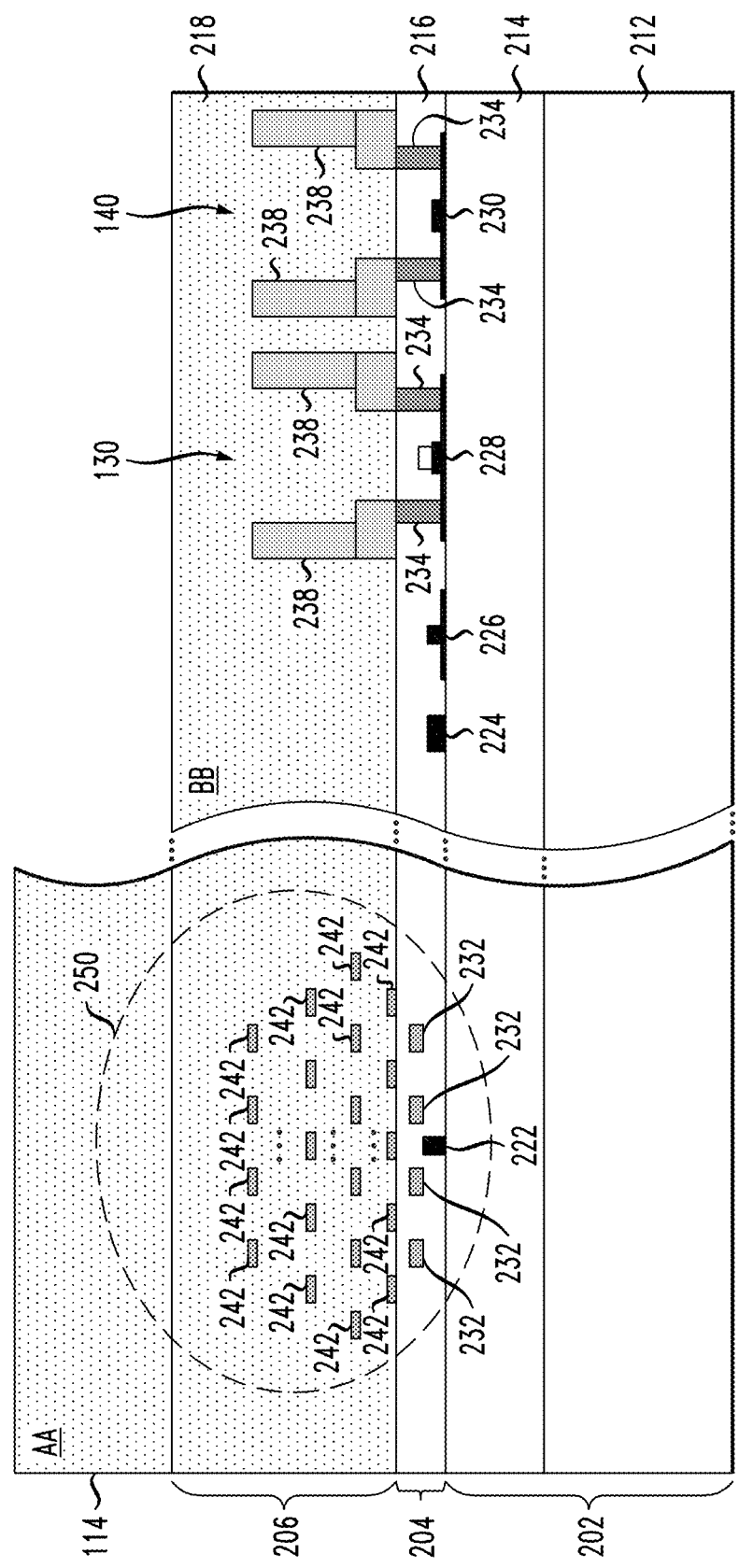
FIG. 2 shows cross-sectional views of the PIC shown in FIG. 1A according to an embodiment.

FIG. 2 shows cross-sectional views of PIC 100 according to an embodiment. More specifically, the shown cross-sectional views correspond to the embodiment of FIG. 1A and represent cross-section planes AA and BB that are parallel to edge 104 and orthogonal to a main plane of PIC 100. The positions of the cross-section planes AA and BB and orientations of the views are also indicated in FIG. 1A.

Note that cross-section plane AA is closer to the edge 104 of PIC 100 than cross-section plane BB. As shown, in cross-section plane AA, PIC 100 has vertically stacked portions 202, 204, and 206 and epoxy layer 114 (also see FIG. 1A). In cross-section plane BB, epoxy layer 114 is absent. A cross-sectional view of optical edge coupler $110_2$ is not explicitly shown in FIG. 2 for clarity, as this view may be similar to the cross-sectional view of optical edge coupler $110_1$, which is explicitly shown in FIG. 2.

Portion 202 comprises a substrate layer 212 and a BOX layer 214. In an example embodiment, the layers 212 and 214 may be parts of the initial SOI wafer, using which PIC 100 is fabricated. In an example embodiment, BOX layer 214 may have a thickness of approximately 3 μm or smaller.

Portion 204 comprises patterned portions of the device layer of the initial SOI wafer and further comprises layers and structures typically formed during the FEOL processing. More specifically, portion 204 comprises optical waveguide cores 222 and 224 and an optical ridge-waveguide core 226, each of which may be formed by appropriately patterning and etching the device layer of the SOI wafer. Portion 204 further comprises semiconductor device portions 228, 230 of photodetector 130 and optical phase shifter 140, respectively (also see FIG. 1A). Device portions 228, 230 may similarly be formed by patterning and etching the device layer of the SOI wafer. The device layer of the SOI wafer may comprise silicon and have a refraction index of approximately 3.48 at the wavelength of 1550 nm.

Portion 204 further comprises a plurality of optical waveguide cores 232 arranged in a substantially planar array. In an example embodiment, optical waveguide cores 232 may comprise (be made of) silicon nitride. In such embodiments, optical waveguide cores 232 may have a refraction index of about 2.0. In an alternative embodiment, optical waveguide cores 232 may comprise (be made of) silicon oxynitride ($SiO_xN_y$) and/or amorphous silicon. Optical waveguide cores 222, 232 are parts of optical edge coupler $110_1$ (also see FIG. 1A).

Portion 204 further comprises a silicon-oxide layer 216 formed around optical waveguide cores 222, 224, 226, 232 and device portions 228, 230 as indicated in FIG. 2. Vertical vias 234 formed in the silicon-oxide layer 216 are filled with a suitable electrically conducting material to electrically connect device portions 228, 230 to metal-interconnect structures 238 of portion 206. In an example embodiment, silicon-oxide layer 216 may have a thickness in the range between approximately 1 μm and approximately 2 μm.

Portion 206 comprises layers and structures formed during the BEOL processing. More specifically, different parts of portion 206 comprise the above-mentioned metal-interconnect structures 238 and a plurality of optical waveguide cores 242. Optical waveguide cores 242 are arranged in four substantially planar arrays, with each array being located at a different respective vertical distance from silicon-oxide layer 216. In an example embodiment, optical waveguide cores 242 may comprise silicon nitride. In an alternative embodiment, optical waveguide cores 242 may comprise silicon oxynitride and/or amorphous silicon. Optical waveguide cores 242 are parts of optical edge coupler $110_1$ (also see FIG. 1A).

Portion 206 further comprises a silicon-oxide layer 218 that encapsulates optical waveguide cores 242 and, if present, metal-interconnect structures 238, e.g., as indicated in FIG. 2. In an example embodiment, silicon-oxide layer 218 may have a thickness in the range between approximately 2 μm and approximately 8 μm. Epoxy layer 114 is deposited over silicon-oxide layer 218 and may have a thickness of greater than approximately 4 μm.

During BEOL processing, optical waveguide cores 242 and silicon-oxide layer 218 may be formed using a sequence of multiple fabrication steps, e.g., including example steps of: (i) depositing a silicon-nitride layer; (ii) patterning and etching the silicon-nitride layer to form horizontal optical waveguide cores 242 of the corresponding one of the planar arrays; (iii) depositing a silicon-oxide layer over the array of horizontal optical cores formed at step (ii); and (iv) performing planarization of the top surface of the deposited silicon-oxide layer. Steps (i)-(iv) can then be repeated to form additional encapsulated planar arrays of optical waveguide cores 242. For example, to form four encapsulated planar arrays of horizontal optical waveguide cores 242, as shown in FIG. 2, the sequence of steps (i)-(iv) may be repeated four times. As a result, silicon-oxide layer 218 comprises multiple thinner silicon-oxide layers, each of which is formed during the corresponding instance of steps (iii)-(iv). The deposition of such multiple thinner silicon-oxide layers may be controlled, e.g., to make these layers nearly identical in terms of chemical composition and refraction-index values.

In an example embodiment, BOX layer 214 may comprise substantially stoichiometric $SiO_2$, whose refraction index at the wavelength of 1550 nm is close to 1.445. FEOL silicon-oxide layer 216 is typically formed at relatively high temperatures to cause the silicon oxide therein to also be substantially stoichiometric $SiO_2$ and have a refraction index close to 1.445. Typically, the difference (if any) between the refraction indices of silicon-oxide layers 214 and 216 may be smaller than 0.002.

During BEOL processing, the thinner constituent layers of silicon-oxide layer 218 may be formed using plasma-enhanced chemical vapor deposition (PECVD). The stoichiometry of PECVD silicon oxide may be expressed as $SiO_{2-x}$ may depend, in a known manner, on various parameters of the PECVD process, such as the chemical composition of precursor gases, gas flow rates, plasma power, stress and/or strain within the nascent silicon-oxide layer(s), etc. In an example embodiment, such parameters are selected and controlled to cause the thinner constituent layers of silicon-oxide layer 218 to have substantially the same (e.g., to within 0.001) refraction-index value. This value may typically be any selected value from the range between 1.45 and 1.52. As a result, upon fabrication, the difference between the refraction indices of the silicon-oxide, optical cladding layer of the structure 214/216 and the group of silicon-oxide, optical cladding layers of layer 218 may be greater than approximately 0.01. Subsequent exposure of PIC 100 to hot and humid weather after deployment thereof in the field may further increase the latter refraction-index difference, e.g., due to the exposure-induced changes in the chemical composition and/or internal stress of layer 218.

In an example embodiment, the epoxy for layer 114 may be selected such that the refraction index of the cured epoxy closely matches the refraction index of silicon-oxide, optical cladding layer 218. For example, a difference between the refraction indices of epoxy layer 114 and silicon-oxide, optical cladding layer 218 may be smaller than 0.005. Epoxy layer 114 may typically be added to the vertical stack of layers of PIC 100 during post-fabrication processing.

Portions of layers 214, 216, and 218 adjacent to optical cores 222, 232, and 242 provide optical cladding for these optical cores. A dashed curve 250 indicates an approximate mode-field area for the corresponding guided optical mode in optical edge coupler 110 near edge 104 of PIC 100. In an example embodiment, the MFD corresponding to the area 250 may be approximately 10 μm. Note that, in the shown embodiment, area 250 is partially located in epoxy layer 114 (also see FIG. 1A). As such, the optical cladding of optical cores 222, 232, and 242 may also include portions of epoxy layer 114.

FIG. 3 shows another cross-sectional view of PIC 100 according to an embodiment, e.g., vertically through the optical edge couplers $110_1$, $110_2$, and 110 of FIGS. 1A-1C. More specifically, the shown cross-sectional view corresponds to a cross-section plane that is orthogonal to edge 104 and orthogonal to a main plane of PIC 100 (also see FIGS. 1A-1C). In this particular view, the connection between optical core 222 (also see FIG. 2) and optical core 102 (also see FIG. 1A) is visible. As already indicated above, epoxy layer 114 may be absent in some embodiments.

In at least some embodiments, the widths of some or all of optical waveguide cores 222, 232, and 242 may not be constant along the light-propagation direction. For example, waveguide-core widths may be tapered to facilitate an MFD change along the light-propagation direction, e.g., from about 10 μm near edge 104 to about 0.5 μm near optical fiber core 102, i.e., to cause an adiabatic reduction in a lateral area of the received light beam and/or a displacement of a center of said light beam towards optical core 222 as the light propagates farther from the edge 104 into PIC 100. That is, the received light beam is gradually laterally modified by the varying refractive index pattern formed by the array of optical cores 232 and 242 and surrounding vertically graded optical cladding of layers 216, 218, and 114 to improve the optical coupling of light of said beam to the silicon core 102 of an on-chip optical waveguide of PIC 100.

In some embodiments, optical waveguide core 222 may not extend all the way to edge 104. In such embodiments, the right end of optical waveguide core 222 is located at a non-zero distance from edge 104.

In the shown embodiment, optical waveguide cores 232 and 242 have the same length, i.e., the left ends of optical waveguide cores 232 and 242 are at the same distance from the edge 104. In an alternative embodiment, optical waveguide cores 232 may have, e.g., a larger length than any of the optical waveguide cores 242. In the latter embodiment, the left ends of optical waveguide cores 232 are at a larger distance from edge 104 than the left ends of optical waveguide cores 242.

In some embodiments, optical waveguide cores 232 may have a larger vertical thickness than any of the optical waveguide cores 242. Depending on the embodiment, different ones of optical waveguide cores 242 may have the same vertical thickness or different vertical thicknesses.

In FIG. 3, the distances between different vertical levels of optical waveguide cores 222, 232, and 242 in optical edge coupler 110 are denoted as $d_0$-$d_4$. In the shown embodiment, the distances $d_0$-$d_4$ may have the following relative values: $d_0 < d_1 < d_2 = d_3 < d_4$. In various alternative embodiments, other relative values of the distances $d_0$-$d_4$ may also be used.

FIGS. 2-3 illustrate example embodiments of optical edge coupler 110 having four vertical levels of optical waveguide cores 242. In alternative embodiments, optical waveguide cores 242 may be arranged in a different (from four) number of such vertical levels. For example, the number of vertical levels and the numbers of optical waveguide cores 242 in each corresponding planar array of cores may be selected based on a desired shape and size of the mode-field area 250 (FIG. 2). The horizontal widths of individual ones of optical waveguide cores 222, 232, and 242 may also be selected based on the desired shape and size of mode-field area 250.

Some embodiments may benefit from some of the features of the arrays of optical cores of the optical edge couplers disclosed in U.S. Pat. No. 10,942,314, which is incorporated herein by reference in its entirety.

At least some embodiments of optical edge coupler 110 (including 110$_1$-110$_4$) may provide at least some of the following improvements with respect to the state of the art: (i) better stability of the shape, size, and position of the mode-field area (e.g., 250, FIG. 2) when the corresponding PIC is used under hot/humid ambient conditions; (ii) slower degradation of the optical coupling efficiency of the corresponding optical edge coupler due to aging; and (iii) improved robustness of the optical-edge-coupler characteristics with respect to variances in the PIC fabrication process.

In some alternative embodiments, an optical edge coupler may be constructed using three or more groups of optical cladding layers. Each of such groups may be characterized by a different respective (e.g., median) refraction index, wherein a refraction-index difference between any two layers of the same group is smaller than approximately 0.002, and a refraction-index difference between two layers of two different groups is greater than approximately 0.005. In some cases, some of such groups may not have any optical cores therein, e.g., may be used as optical-cladding spacers between differently vertically positioned arrays of optical cores. In some embodiments, the groups may be vertically stacked such that the values of the median refraction indices of the groups monotonically increase or decrease with the increase of the vertical distance from substrate 212.

According to an example embodiment disclosed above, e.g., in the summary section and/or in reference to any one or any combination of some or all of FIGS. 1-3, provided is an apparatus comprising: a substrate (e.g., 212, FIGS. 2-3) having a substantially planar main surface; and an optical edge coupler (e.g., 110, FIG. 1) located adjacent an edge (e.g., 104, FIG. 1) of the substrate; and wherein the optical edge coupler comprises: a plurality of optical cores (e.g., 222, 232, 242, FIGS. 2-3) supported along said main surface of the substrate; and a vertical stack of dielectric layers (e.g., 214, 216, 218, FIGS. 2-3) arranged along said main surface, the vertical stack of dielectric layers being an optical cladding for the optical cores such that some of the optical cores are located in a first subset of the layers (e.g., 214, 216, FIGS. 2-3) and others of the optical cores are located in a second subset of the layers (e.g., 218, FIGS. 2-3), each of the subsets including respective one or more of the layers, the one or more layers of the first subset having a different refraction index than the one or more layers of the second subset, the one or more layers of the first subset being closer to the main surface than the one or more layers of the second subset, at least some of the optical cores having end segments thereof adjacent to the edge.

In some embodiments of the above apparatus, the layers of the first and second subsets are formed of silicon oxides.

In some embodiments of any of the above apparatus, each layer of the second subset has a greater refraction index than each layer of the first subset.

In some embodiments of any of the above apparatus, a refraction-index difference between any two layers of the first subset is smaller than 0.002.

In some embodiments of any of the above apparatus, a refraction-index difference between any of the one or more layers of the first subset and any of the one or more layers of the second subset is greater than 0.01.

In some embodiments of any of the above apparatus, one of the optical cores (e.g., 222, FIGS. 2-3) has a greater refraction index than any other of the optical cores.

In some embodiments of any of the above apparatus, the one of the optical cores is a silicon core; and wherein said other of the optical cores are dielectric cores.

In some embodiments of any of the above apparatus, the dielectric cores are silicon-nitride cores.

In some embodiments of any of the above apparatus, the vertical stack of dielectric layers comprises a polymer layer (e.g., 114, FIGS. 2-3) having a greater distance to the main surface than the one or more layers of the second subset.

In some embodiments of any of the above apparatus, a refraction-index difference between the polymer layer and any of the one or more layers of the second subset is smaller than 0.005.

In some embodiments of any of the above apparatus, portions of the polymer layer are parts of the optical cladding.

In some embodiments of any of the above apparatus, the apparatus further comprises an optical fiber (e.g., 152$_1$, FIG. 1) optically end-coupled to the end segments; and wherein the optical fiber is affixed to the edge, at least in part, by the polymer layer.

In some embodiments of any of the above apparatus, the apparatus further comprises: one or more semiconductor device portions (e.g., 228, 230, FIG. 2) in the first subset of layers; and a metal-interconnect structure (e.g., 238, FIG. 2) in the second subset of the layers, the metal-interconnect structure being electrically connected to the one or more semiconductor device portions.

In some embodiments of any of the above apparatus, said some of the optical cores are arranged in a first planar array parallel to the main surface; and wherein said others of the optical cores are arranged in a plurality of second planar arrays parallel to the main surface, each of the second planar arrays being at a different respective vertical distance from the main surface.

In some embodiments of any of the above apparatus, the optical cores of the first planar array have a greater vertical thickness than the optical cores of the second planar arrays.

According to another example embodiment disclosed above, e.g., in the summary section and/or in reference to any one or any combination of some or all of FIGS. 1-3, provided is an apparatus comprising: a plurality of optical waveguide cores (e.g., 222, 232, 242, FIGS. 2-3) supported on a main surface of a substantially planar substrate (e.g., 212, FIGS. 2-3); and a vertical stack of dielectric layers (e.g., 214, 216, 218, FIGS. 2-3) arranged along the main surface to provide an optical cladding for the optical waveguide cores, the dielectric layers including a first group of layers (e.g., 214, 216, FIGS. 2-3) characterized by a first refraction index and a second group of layers (e.g., 218, FIGS. 2-3) characterized by a different second refraction index, the first group of layers having a smaller vertical distance to the main surface than the second group of layers, at least some of the optical waveguide cores having end sections thereof adjacent to an edge (e.g., 104, FIG. 3) of the vertical stack; and wherein the plurality of optical waveguide cores has two or more first optical waveguide cores (e.g., 232, FIGS. 2-3) in the first group of layers and two or more second optical waveguide cores (e.g., 242, FIGS. 2-3) in the second group of layers.

In some embodiments of the above apparatus, the first and second groups of layers comprise silicon oxide.

In some embodiments of any of the above apparatus, the second refraction index is greater than the first refraction index.

In some embodiments of any of the above apparatus, a refraction-index difference between any two layers of the first group is smaller than 0.002; and wherein a refraction-index difference between any layer of the first group and any layer of the second group is greater than 0.01.

In some embodiments of any of the above apparatus, the plurality of optical waveguide cores includes a third optical waveguide core (e.g., 242, FIGS. 2-3) having a greater refraction index than the first and second optical waveguide cores.

In some embodiments of any of the above apparatus, the first and second optical waveguide cores comprise silicon nitride; and wherein the third optical waveguide core comprises silicon.

In some embodiments of any of the above apparatus, the vertical stack of layers comprises a polymer layer (e.g., 114, FIGS. 2-3) having a greater vertical distance to the main surface than the second group of layers.

In some embodiments of any of the above apparatus, a refraction-index difference between the polymer layer and any layer of the second group of layers is smaller than 0.005.

In some embodiments of any of the above apparatus, portions of the polymer layer are parts of the optical cladding.

In some embodiments of any of the above apparatus, the apparatus further comprises an optical fiber (e.g., 152$_1$, FIG. 1) optically coupled to the end sections; and wherein the optical fiber is affixed to the edge of the vertical stack using the polymer layer.

In some embodiments of any of the above apparatus, at least a portion (e.g., 216, FIGS. 2-3) of the first group of layers is fabricated using FEOL processing of a corresponding wafer; and wherein the second group of layers is fabricated using BEOL processing of the corresponding wafer.

In some embodiments of any of the above apparatus, the apparatus further comprises: one or more semiconductor device portions (e.g., 228, 230, FIG. 2) in the first group of layers; and a metal-interconnect structure (e.g., 238, FIG. 2) in the second group of layers, the metal-interconnect structure being electrically connected to the one or more semiconductor device portions.

In some embodiments of any of the above apparatus, the first optical waveguide cores are arranged in a first planar array parallel to the main surface of the substrate; and wherein the second optical waveguide cores are arranged in a plurality of second planar arrays parallel to the main surface, each of the second planar arrays being at a different respective vertical distance from the main surface of the substrate.

In some embodiments of any of the above apparatus, the first optical waveguide cores have a greater vertical thickness than the second optical waveguide cores.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the layers are horizontal but would be horizontal where the layers are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
a substrate having a substantially planar main surface; and
an optical edge coupler located adjacent an edge of the substrate; and
wherein the optical edge coupler comprises:
  a plurality of optical cores supported along said main surface of the substrate; and
  a vertical stack of dielectric layers arranged along said main surface, the vertical stack of dielectric layers being an optical cladding for the optical cores such that some of the optical cores are located in a first subset of the layers and others of the optical cores are located in a second subset of the layers, each of the first and second subsets including respective one or more of the layers, the one or more layers of the first subset having a different refraction index than the one or more layers of the second subset, the one or more layers of the first subset being closer to the main surface than the one or more layers of the second subset, at least some of the optical cores having end segments thereof adjacent to the edge, wherein each layer of the second subset has a greater refraction index than each layer of the first subset.

2. The apparatus of claim 1, wherein the layers of the first and second subsets are formed of silicon oxides.

3. The apparatus of claim 1, wherein a refraction-index difference between any two layers of the first subset is smaller than 0.002.

4. The apparatus of claim 3, wherein a refraction-index difference between any of the one or more layers of the first subset and any of the one or more layers of the second subset is greater than 0.01.

5. The apparatus of claim 1, wherein one of the optical cores has a greater refraction index than any other of the optical cores.

6. The apparatus of claim 5,
wherein the one of the optical cores is a silicon core; and
wherein said other of the optical cores are dielectric cores.

7. The apparatus of claim 5, wherein the dielectric cores are silicon-nitride cores.

8. The apparatus of claim 1, wherein the vertical stack of dielectric layers comprises a polymer layer having a greater distance to the main surface than the one or more layers of the second subset.

9. The apparatus of claim 8, wherein a refraction-index difference between the polymer layer and any of the one or more layers of the second subset is smaller than 0.005.

10. The apparatus of claim 8, wherein portions of the polymer layer are parts of the optical cladding.

11. The apparatus of claim 8, further comprising an optical fiber optically end-coupled to the end segments; and
wherein the optical fiber is affixed to the edge, at least in part, by the polymer layer.

12. The apparatus of claim 1, further comprising:
one or more semiconductor device portions in the first subset of layers; and
a metal-interconnect structure in the second subset of the layers, the metal-interconnect structure being electrically connected to the one or more semiconductor device portions.

13. The apparatus of claim 1,
wherein said some of the optical cores are arranged in a first planar array parallel to the main surface; and
wherein said others of the optical cores are arranged in a plurality of second planar arrays parallel to the main surface, each of the second planar arrays being at a different respective vertical distance from the main surface.

14. The apparatus of claim 13, wherein the optical cores of the first planar array have a greater vertical thickness than the optical cores of the second planar arrays.

15. The apparatus of claim 1,
wherein at least a portion of the first subset of layers is fabricated using FEOL processing of a corresponding wafer; and
wherein the second subset of layers is fabricated using BEOL processing of the corresponding wafer.

16. An apparatus, comprising:
a substrate having a substantially planar main surface; and
an optical edge coupler located adjacent an edge of the substrate; and
wherein the optical edge coupler comprises:
  a plurality of optical cores supported along said main surface of the substrate; and
  a vertical stack of dielectric layers arranged along said main surface, the vertical stack of dielectric layers being an optical cladding for the optical cores such that some of the optical cores are located in a first subset of the layers and others of the optical cores are located in a second subset of the layers, each of the first and second subsets including respective one or more of the layers, the one or more layers of the first subset having a different refraction index than the one or more layers of the second subset, the one or more layers of the first subset being closer to the main surface than the one or more layers of the second subset, at least some of the optical cores having end segments thereof adjacent to the edge, wherein the vertical stack of dielectric layers comprises a polymer layer having a greater distance to the main surface than the one or more layers of the second subset.

17. The apparatus of claim 16, wherein a refraction-index difference between the polymer layer and any of the one or more layers of the second subset is smaller than 0.005.

18. The apparatus of claim 16, wherein portions of the polymer layer are parts of the optical cladding.

19. The apparatus of claim 16, further comprising an optical fiber optically end-coupled to the end segments; and
    wherein the optical fiber is affixed to the edge, at least in part, by the polymer layer.

20. An apparatus, comprising:
    a substrate having a substantially planar main surface; and
    an optical edge coupler located adjacent an edge of the substrate, wherein the optical edge coupler comprises:
        a plurality of optical cores supported along said main surface of the substrate; and
        a vertical stack of dielectric layers arranged along said main surface, the vertical stack of dielectric layers being an optical cladding for the optical cores such that some of the optical cores are located in a first subset of the layers and others of the optical cores are located in a second subset of the layers, each of the first and second subsets including respective one or more of the layers, the one or more layers of the first subset having a different refraction index than the one or more layers of the second subset, the one or more layers of the first subset being closer to the main surface than the one or more layers of the second subset, at least some of the optical cores having end segments thereof adjacent to the edge;
    one or more semiconductor device portions in the first subset of layers; and
    a metal-interconnect structure in the second subset of the layers, the metal-interconnect structure being electrically connected to the one or more semiconductor device portions.

* * * * *